(12) United States Patent
Noonan et al.

(10) Patent No.: US 6,270,865 B1
(45) Date of Patent: *Aug. 7, 2001

(54) HIGH AIR VELOCITY DUCT BOARD HAVING MINIMAL TURBULENCE

(76) Inventors: Patrick M. Noonan, 286 N. 600 West, Boggstown, IN (US) 46110; Robert D. Hauk, 1021 S. Harrison, Shelbyville, IN (US) 46176; Frederick M. Beyer, 5451 S. 800 East, St. Paul, IN (US) 47272

( * ) Notice: Subject to any disclaimer, the term of this patent is extended or adjusted under 35 U.S.C. 154(b) by 0 days.

This patent is subject to a terminal disclaimer.

(21) Appl. No.: 09/120,250

(22) Filed: Jul. 21, 1998

Related U.S. Application Data

(63) Continuation of application No. 08/753,257, filed on Nov. 21, 1996, now Pat. No. 5,783,268, which is a continuation of application No. 08/378,704, filed on Jan. 26, 1995, now abandoned, which is a continuation-in-part of application No. 08/104,975, filed on Aug. 11, 1993, now abandoned.

(51) Int. Cl.[7] .................. B32B 17/02; F16L 9/14
(52) U.S. Cl. ............ 428/34.5; 428/35.9; 428/36.1; 428/411.1; 428/441; 428/219; 428/192; 428/60; 428/57; 428/81; 138/149; 138/155; 442/219; 442/273; 442/212; 442/415; 156/628

(58) Field of Search .................. 428/345, 35.9, 428/36.1, 411.1, 441, 219, 192, 60, 57, 81; 138/149, 155; 442/219, 273, 212, 415; 156/62.8

(56) References Cited

U.S. PATENT DOCUMENTS

| | | | |
|---|---|---|---|
| 2,341,130 | * 2/1944 | Unsworth | 156/62.8 |
| 2,647,857 | * 8/1953 | Schwartz | 156/67.8 |
| 3,092,529 | * 6/1963 | Pearson | 138/149 |
| 3,394,737 | * 7/1968 | Hoffmann et al. | 138/149 |
| 3,768,523 | * 10/1973 | Schroeder | 138/149 |
| 4,839,222 | * 6/1989 | Jain | 428/290 |
| 5,421,938 | * 6/1995 | Cunningham, Jr. | 156/217 |
| 5,783,268 | * 7/1998 | Noonan et al. | 428/34.5 |

* cited by examiner

*Primary Examiner*—William P. Watkins, III

(57) ABSTRACT

A rigid air duct is provided for conducting flowing air. The air duct includes a fiber glass board that is deformed to define a channel for conducting flowing air. A mat facing is adhered to an interior surface of the board and is made of a fabric including glass fibers. Uncured portions of a binder material in the fiber glass board are heated and cured to adhere the mat facing to the board.

11 Claims, 2 Drawing Sheets

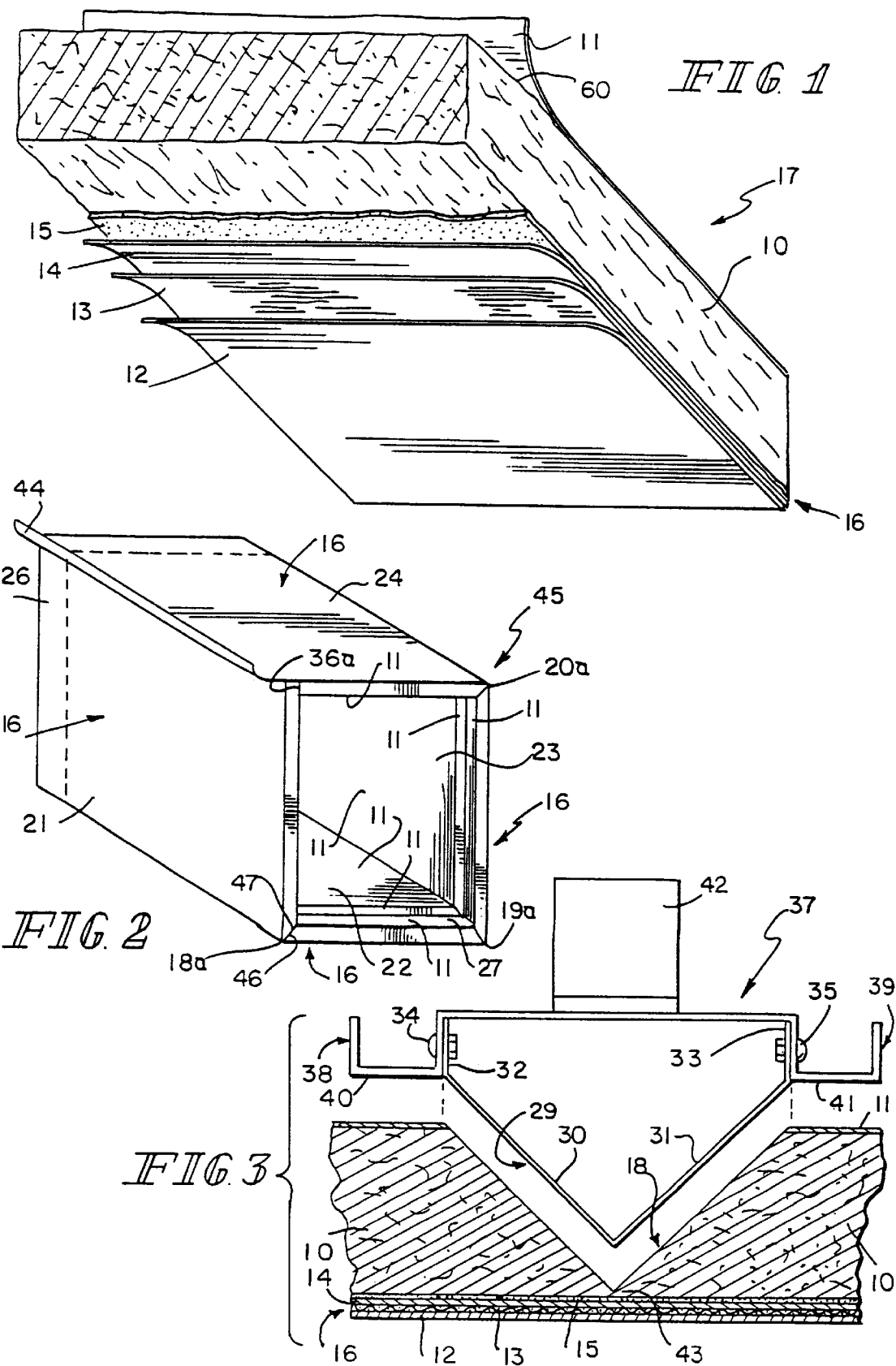

HIGH AIR VELOCITY DUCT BOARD HAVING MINIMAL TURBULENCE

This application is a continuation of application Ser. No. 08/753,257, filed Nov. 21, 1996, now U.S. Pat. No. 5,783,268, which is a continuation of application Ser. No. 08/378,704, filed Jan. 26, 1995, now abandoned, which is a continuation-in-part of application Ser. No. 08/104,975, filed Aug. 11, 1993 now abandoned.

BACKGROUND AND SUMMARY OF THE INVENTION

This invention relates generally to air ducts for residential and commercial use made from resin bonded fiber glass. More specifically, the invention relates to an improved air duct manufactured from resin-bonded fiber glass that includes an improved interior flowing air surface having a rated capacity air flow of up to about 5,000 feet per minute with less turbulence than is presently experienced in ducts whose rated capacity is approximately one-half that value. The invention further includes improved means for sanitizing the duct.

Currently, air ducts are manufactured from resin-bonded fiber glass formed into rigid, rectangular boards. Air duct systems manufactured from such boards are used in commercial and residential air-handling installations for cooling, heating, or dual-temperature service. The operating temperatures range up to 250° F. with a maximum air velocity of 2,400 feet per minute and 2-inch water gauge static pressure. Air-handling systems made from such materials provide the combined benefits of good thermal insulation, vapor retardation, noise absorption, low leakage and easy fabrication.

Despite the above-described advantages, current construction requirements demand even higher performance. Specifically, exposed fiber glass board will often accumulate dirt, dust, and microorganisms if not adequately cleaned and it is difficult as well as expensive to clean the inside of an insulated duct. Further, fiber glass board is relatively rough and such roughness results in turbulent flow at the board surface thereby causing increased friction loss and requiring additional energy to pump air through the ducts.

One previous attempt at solving the aforenoted problems has been the application of an acrylic coating on the surfaces of the fiber glass board exposed to the flowing air. However, a significant amount of turbulence still exists during normal operating conditions even with the use of acrylic coatings. Thus an even greater degree of laminar flow adjacent to the interior surface of the duct board is desired. Further, the acrylic does not provide as smooth an interior surface as desired and therefore dirt, dust and microorganisms still accumulate in the interior surfaces of acrylic treated ducts. Unsanitary conditions can therefore become a problem because manufacturers often instruct end users not to clean the interior of the air ducts for fear of damage to the ducts, and hence a practical and effective way to apply biocide treatment to the inside of the duct is desired to reduce the likelihood of the accumulation and flourishment of microorganisms in the ducts during use.

Therefore, there is a need in the insulation and construction industries for an improved thermally insulated air duct with an improved interior surface. The interior surface should be smooth to reduce friction loss and to resist the accumulation of dirt and other debris. Further, the interior surface must be treatable with biocides to reduce the likelihood of accumulation of microorganisms inside the duct.

A rigid air duct is provided for conducting flowing air, the air duct including a fiber glass board having an interior surface and an exterior surface. The fiber glass board is deformed to cause the interior surface to define a channel for conducting flowing air. The air duct also includes a mat facing adhered to the interior surface of the fiber glass board to provide a smooth air-contacting surface lining the channel to maximize laminar flow of air flowing through the channel. The mat facing is a fabric including glass fibers. The fiber glass board includes fiber glass material and uncured portions of a binder material in the fiber glass material. The mat facing is adhered to the interior surface of the fiber glass board by subjecting the fiber glass board and the mat facing to a temperature which causes curing of the uncured portions of the binder material in the fiber glass material while the mat facing abuts the interior surface of the fiber glass board.

Also in preferred embodiments, an adhesive used to adhere the mat facing to the fiber glass board includes a first portion situated in the fiber glass board and a second portion positioned to lie between the fiber glass board and the mat facing. The first portion is binder material in the fiber glass board.

In preferred embodiments, the fiber glass board further includes a first shiplap edge adjacent to the interior surface and the mat facing is adhered to the shiplap edge. The fiber glass board further includes a second shiplap edge lying in spaced-apart relation to the first shiplap edge to position the interior surface therebetween. The mat facing is adhered to the first and second shiplap edges.

Additional features and advantages of the invention will become apparent to those skilled in the art from the following description of the invention.

BRIEF DESCRIPTION ON THE DRAWINGS

The invention is illustrated more or less diagrammatically in the accompanying drawing in which:

FIG. 1 is a perspective view of the duct board of the present invention with layers peeled away to more clearly illustrate the sandwich-like construction of the duct board;

FIG. 2 is a perspective view of a section of air duct made from the improved duct board of this invention;

FIG. 3 is a view illustrating the method of forming a V groove in a duct board preparatory to assembly into the fabricated product of FIG. 2;

DETAILED DESCRIPTION OF THE DRAWINGS

Figure 4:
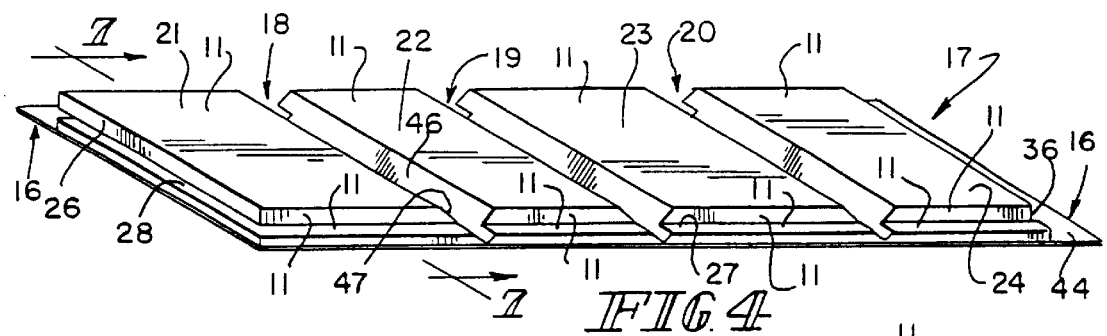
FIG. 4 is a perspective view of a duct board intended to be formed into a straight section following V grooving.

The improvement contributed by the present invention is best understood after consideration of the conventional materials used in fabricating insulated air ducts. Specifically, it will be noted that even high quality resin-bonded fiber glass has a relatively rough surface. The rough surface causes at least two problems. First, the relatively rough surface of resin-bonded fiber glass will accumulate dirt and dust and provide a habitat for microorganisms. Second, the air flow directly adjacent to the surface at straight sections and especially at corners is less likely to be laminar and more likely to be turbulent, thereby causing friction loss and increasing the amount of energy needed to pump the air through the system. An application of acrylic materials to resin-bonded fiber glass duct boards is an improvement over the exposed resin-bonded fiber glass but still does not provide as smooth a surface as desired.

Referring first to FIG. 1, the fiber glass duct board 17 of this invention is shown as consisting of a main, central layer of compressed fiber glass 10 which forms the primary insulation, sound absorption, and structural strength of the board. The fiber glass layer or board 10 may be one or one and a half inches thick and may be generated by conventional forming techniques such as a conventional rotating glass fiberizer. It will be understood that, as is conventional, the glass fibers, following formation at the fiberizer, are collected on a take-away conveyor, compressed to some extent, and directed toward an oven for curing the resin compound which serves as the binder for the fibers to enable them to be formed into a self-sustaining shape.

A mat facing 11 is indicated at 11. The mat facing 11 is preferably a saturated polyester/glass mat with an antimicrobial additive to control mold growth. The mat facing 11 may be colored by any suitable additive. The mat facing 11 is preferably formed with a basis weight of about 30 pounds per 3000 square feet with a tensile strength of about 7 lb./inch minimum in the machine direction and about 5 lb./inch minimum in the cross direction.

The foil-scrim-kraft layers, hereafter sometimes FSK, are shown on the lower side of FIG. 1 which, in use, would be the outside of a duct. The foil 12 may be aluminum foil of between about 0.0005 and 0.001" thickness. The scrim 13 may be tri-directional fiber glass yarn reinforcing with a four per inch measure in both the machine direction and the cross direction. The kraft layer 14 may be a conventional natural kraft paper with, for example, a weight of about 30 lbs. per 3,000 square feet. A conventional adhesive, not shown, which is flame-retardant may be used to maintain the three dissimilar materials in sandwich form. A conventional adhesive, preferably a water-based adhesive, is indicated at 15 for adhering the FSK to the fiber glass board 10. For convenience, the FSK is indicated generally as a unit at 16.

Referring now to FIGS. 2, 3, and 4, the V groove method of fabricating the duct board 17 of FIG. 1 into a section of a duct is illustrated.

Referring initially to FIG. 4, it will be seen that a rigid duct board is indicated generally at 17. The duct board 17 may be of any suitable size required for the formation of an air duct in residential and/or commercial installations. It may, for example, be initially manufactured in 4'×8' or 4'×10' sizes. In this instance, the duct board 17 is being prepared for formation into a section of a duct by the V groove method of fabrication. Thus three V grooves are indicated generally at 18, 19, and 20 cut in the 4' dimension of the duct board 17. The three V grooves divide the duct board 17 into sections 21, 22, 23, and 24. Male and female shiplap edges running the entire width of the duct board 17 as viewed in FIG. 4 are indicated at 26, 27 and will be described in detail hereinafter. It will be noted that an additional cut has been made on the left edge to form a step indicated at 28. However, the right edge 36 has been formed with a flat surface throughout the combined thickness of the mat facing and the fiber glass layer 10, the flat surface 36 being formed inwardly of the edge of FSK 16 so as to form a flap 44.

The method of forming the V grooves is shown in FIG. 3. After placement of an as-manufactured duct board 17 on a cutting table or in a fixture, a V shaped knife, indicated generally at 29, having cutting edges 30, 31 is driven across the duct board 17 to form a V groove 18. The knife blade has upper flanges 32, 33 which are fastened by any suitable means, such as bolts 34, 35, to a combined handle and spacer indicated generally at 37. The handle/spacer 37 includes a pair of shoes indicated generally at 38, 39, the undersurfaces 40, 41 of which come in contact with, and slide on, the mat facing 11 on each side of the groove 18 as the knife 29 is moved across the duct board 17 to form the groove 18. A handle for the knife 29 is indicated at 42.

It will be noted that the depth of cut of the knife 29 is just slightly less than the combined thickness of the mat facing 11 and the fiber glass board 10. As a result, a very thin layer 43 of fiber glass remains above and in contact with FSK 16 so that the danger of cutting FSK 16 by knife 29 is avoided. The fiber glass 43 should be as thin as possible while performing its function of protecting FSK 16 from degradation, though it must be sufficiently thin to form no impedance to bending of the grooved duct board 17.

Referring now to FIG. 2, it will be seen that the grooved fiber glass duct board 17 shown in its lay-flat position of FIG. 4 has been folded about the three V grooves 18, 19, 20 to form a portion of a duct indicated generally at 45. Thus the edges 46, 47 of groove 18 have been rotated 90° with respect to each other to form an inclined joint 18a. Similar joints are formed at 19a and 20a. However, a line or butt joint has been formed at 36a where edge 36 butts against step 28. Flap 44 is thus available to be folded down against the exterior surface of section 21 and taped during installation to provide a rigid structure. The male portion of shiplap edge 26 is indicated by the dotted line at the rear end of duct section 45 and the female portion is indicated at 27.

Figure 5:
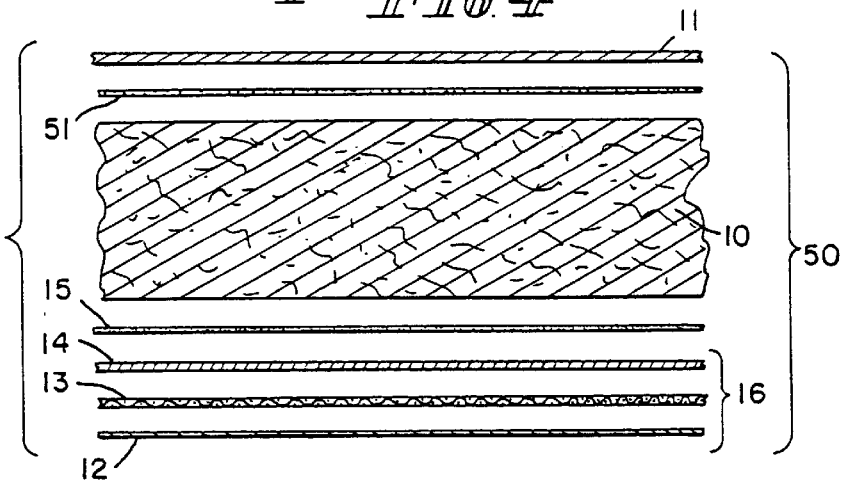
FIG. 5 is an exploded sectional view of another form of the improved duct board of this invention.

An alternative embodiment of the duct board is indicated generally at 50 in FIG. 5. In this embodiment, a layer of adhesive 51 is shown between mat facing 11 and the fiber glass board 10 for ensuring good adherence of the mat facing 11 to the fiber glass board 10.

As noted above, the preferred fabric for the mat 11 is a blend of glass fibers, polyester fibers, and styrene-based polymers. Use of air surface facing means 11 made in accordance with the present invention reduces the friction loss correction factors attributable to the friction between the flowing air and the inner or upper surface 60 of the fiber glass board 10.

Figure 6:
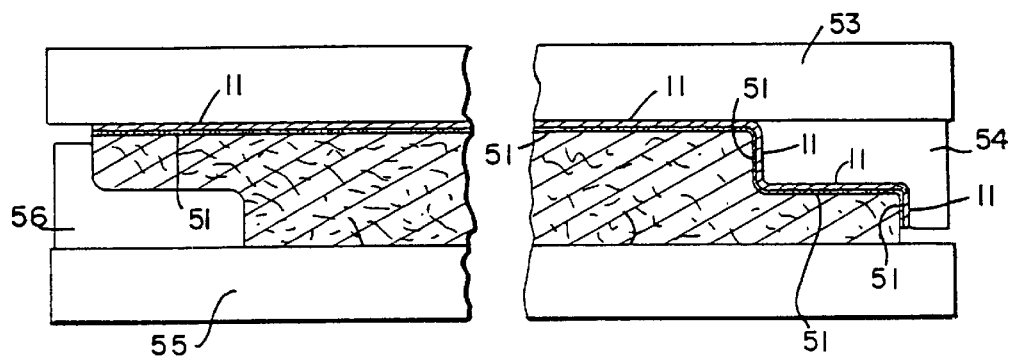
FIG. 6 is a broken sectional view of the improved duct board of this invention during manufacture illustrating the edge compressed fiber glass blanket and the air surface mat on the intended inside surface of the duct board.

FIG. 6 illustrates the duct board as it appears while being cured in an oven. Specially, the board 50 has been compressed after mat facing 11 has been applied to the fiber glass board 10. The fiber glass board 10 and mat facing 11 are shown being transported through a flighted oven having a top flight 53, to which a shoe 54 is secured, and a bottom flight 55, to which a shoe 56 is secured, to create the shiplap ends indicated at 26 and 27 in FIG. 4. In this instance, a layer of adhesive 51 is shown. It will be understood that the heat of the oven will adhere the mat facing 11 to the fiber glass board 50 by reason of the uncured or only partially cured binder in the fiber glass board 50 as it reaches the oven. However, to ensure that no separation of mat facing 11 from the fiber glass board 50 will later occur, the adhesive 51 may be used.

Figure 7:
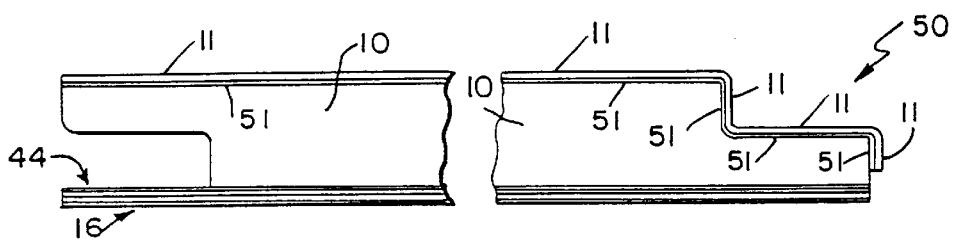
FIG. 7 is a broken section through the completed glass fiber duct board of this invention.

FIG. 7 illustrates the contour of the duct board 50 in an as-manufactured condition, including the end flap 44 of FSK 16 which cooperates with tape (not shown) applied in the field by an installer to produce a structurally rigid final product.

The present invention provides a significant contribution to the art of manufacturing insulated air ducts by providing an improved insulated air duct with a smooth interior surface mat which results in increased laminar flow adjacent to the duct board up to and including about 5,000 feet per minute. The present invention accomplishes this without adding substantially to the cost of manufacture of insulated duct board or requiring changes to the general methods of constructing and installing the insulated ducts.

The improved insulated duct board for constructing insulated air ducts includes an outside or ambient facing means attached to the outside surfaces of the fiber glass duct board. In the preferred embodiment, the outside facing means consists essentially of a foil-scrim-kraft which is adhered to the outer surface of the fiber glass board by adhesive. The fiber glass board is preferably fabricated from inorganic glass fibers bonded by a thermosetting resin to provide a tightly bonded fiber glass mat.

An inside or air surface facing means is applied to the inside surface of the duct board. In the preferred embodiment, the air surface facing means is a fabric made from a combination of glass fibers and other fibers compatible therewith, such as polyester fibers and styrene fibers. The preferred fabric for providing the air surface facing means is a lightweight, woven or non-woven, fabric having a weight of about 15 to about 35 pounds per 2,880 square foot ream of fabric. The air surface facing means may be treated with biocide before or during fabrication thereof or after it has been applied to the inner surface of the fiber glass duct board. By applying the fabric to the formed blanket of fiber glass prior to curing the resin bonded blanket in a curing oven, the surface facing means may be directly adhered to the fiber glass. Alternatively the surface facing means may be adhered to the blanket by an adhesive. In an alternative embodiment, a layer of acrylic is applied to the inside surface of the duct board and the air surface facing means is applied directly to the layer of acrylic. A Biocide material may be applied to the surface facing means after it has been applied to the fiber glass duct board.

Although a detailed description of the invention has been provided, it will at once be apparent to those skilled in the art that variations may be made within the spirit and scope of the invention. Accordingly, it is intended that the scope of the invention be limited solely by the scope of the hereafter appended claims and not by any specific wording in the foregoing description.

What is claimed is:

1. A rigid air duct for conducting flowing air, the air duct comprising a rigid fiber glass board having an interior surface and an exterior surface, the fiber glass board being deformed to cause the interior surface to define a channel for conducting flowing air, a mat facing adhered to the interior surface of the fiber glass board to provide a smooth air-contacting surface lining the channel to maximize laminar flow of air flowing through the channel, the mat facing being a fabric including glass fibers, wherein the fiber glass board includes fiber glass material and uncured portions of a binder material solely in the fiber glass material and the mat facing is adhered to the interior surface of the fiber glass board by subjecting the fiber glass board and the mat facing to a temperature which causes curing of the uncured portions of the binder material solely in the fiber glass material while the mat facing abuts the interior surface of the fiber glass board, and wherein the mat facing has a weight of about 30 pounds per 3000 square feet.

2. A rigid air duct for conducting flowing air, the air duct comprising a rigid fiber glass board having an interior surface and an exterior surface, the fiber glass board being deformed to cause the interior surface to define a channel for conducting flowing air, a mat facing adhered to the interior surface of the fiber glass board to provide a smooth air-contacting surface lining the channel to maximize laminar flow of air flowing through the channel, the mat facing being a fabric including glass fibers, wherein the fiber glass board includes fiber glass material and uncured portions of a binder material solely in the fiber glass material and the mat facing is adhered to the interior surface of the fiber glass board by subjecting the fiber glass board and the mat facing to a temperature which causes curing of the uncured portions of the binder material solely in the fiber glass material while the mat facing abuts the interior surface of the fiber glass board, and wherein the mat facing is characterized by a machine direction and a cross direction and has a tensile strength of about seven pounds per inch minimum in the machine direction and about five pounds per inch in the cross direction.

3. A rigid air duct for conducting flowing air, the air duct comprising a fiber glass board having an interior surface and an exterior surface, the fiber glass board being deformed to cause the interior surface to define a channel for conducting flowing air, and a mat facing adhered to the interior surface of the fiber glass board to provide a smooth air-contacting surface lining the channel to maximize laminar flow of air flowing through the channel, the mat facing being a fabric including glass fibers, wherein the fiber glass board further includes a first shiplap edge adjacent to the interior surface and the mat facing is adhered to the shiplap edge.

4. The air duct of claim 3, wherein the fiber glass board further includes a second shiplap edge lying in spaced-apart relation to the first shiplap edge to position the interior surface therebetween and the mat facing is adhered to the first and second shiplap edges.

5. A rigid air duct for conducting flowing air, the air duct comprising a rigid fiber glass board having an interior surface and an exterior surface, the fiber glass board being deformed to cause the interior surface to define a channel for conducting flowing air, a mat facing in the channel, the mat facing being a fabric including glass fibers, an adhesive adhering the mat facing to the interior surface of the fiber glass board to provide a smooth air-contacting surface lining the channel to maximize laminar flow of air flowing through the channel, wherein the adhesive is situated solely in the fiber glass board, and wherein the mat facing has a weight of about 30 pounds per 3,000 square feet.

6. A rigid air duct for conducting flowing air, the air duct comprising a fiber glass board having an interior surface and an exterior surface, the fiber glass board being deformed to cause the interior surface to define a channel for conducting flowing air, a mat facing in the channel, the mat facing being a fabric including glass fibers, and an adhesive adhering the mat facing to the interior surface of the fiber glass board to provide a smooth air-contacting surface lining the channel to maximize laminar flow of air flowing through the channel, wherein the fiber glass board further includes a first shiplap edge adjacent to the interior surface and the mat facing is adhered to the shiplap edge by the adhesive.

7. The air duct of claim 6, wherein the fiber glass board further includes a second shiplap edge lying in spaced-apart relation to the first shiplap edge to position the interior surface therebetween and the mat facing is adhered to the first and second shiplap edges by the adhesive.

8. A rigid air duct for conducting flowing air, the air duct comprising a fiber glass board having an interior surface and an exterior surface, the fiber glass board being deformed to cause the interior surface to define a channel for conducting flowing air, an acrylic layer applied to the interior surface, a mat facing in the channel, the mat facing being a fabric including glass fibers, the mat facing being applied directly to the acrylic layer applied to the interior surface of the fiber glass board to provide a smooth air-contacting surface lining the channel to maximize laminar flow of air flowing through the channel, and wherein the mat facing has a weight of about 30 pounds per 3000 square feet.

9. A rigid air duct for conducting flowing air, the air duct comprising a fiber glass board having an interior surface and an exterior surface, the fiber glass board being deformed to cause the interior surface to define a channel for conducting flowing air, an acrylic layer applied to the interior surface, a mat facing in the channel, the mat facing being a fabric including glass fibers, the mat facing being applied directly to the acrylic layer applied to the interior surface of the fiber glass board to provide a smooth air-contacting surface lining the channel to maximize laminar flow of air flowing through the channel, and wherein the mat facing is characterized by a machine direction and a cross direction and has a tensile strength of about seven pounds per inch minimum in the machine direction and about five pounds per inch in the cross direction.

10. A rigid air duct for conducting flowing air, the air duct comprising a fiber glass board having an interior surface and an exterior surface, the fiber glass board being deformed to cause the interior surface to define a channel for conducting flowing air, an acrylic layer applied to the interior surface, a mat facing in the channel, the mat facing being a fabric including glass fibers, the mat facing being applied directly to the acrylic layer applied to the interior surface of the fiber glass board to provide a smooth air-contacting surface lining the channel to maximize laminar flow of air flowing through the channel, and wherein the fiber glass board further includes a first shiplap edge adjacent to the interior surface and the mat facing is applied to the shiplap edge.

11. The air duct of claim 10, wherein the fiber glass board further includes a second shiplap edge lying in spaced-apart relation to the first shiplap edge to position the interior surface therebetween and the mat facing is applied to the first and second shiplap edges.

* * * * *